UNITED STATES PATENT OFFICE.

EDWARD R. STOWELL, OF ODEN, MICHIGAN.

PROCESS FOR MAKING A REFRACTORY PLASTIC.

1,327,448.

Specification of Letters Patent. Patented Jan. 6, 1920.

No Drawing. Application filed April 16, 1919. Serial No. 290,463.

*To all whom it may concern:*

Be it known that I, EDWARD R. STOWELL, a citizen of the United States, and a resident of Oden, in the county of Emmet, State of Michigan, have invented and discovered a new and useful process for making a refractory plastic suitable for linings or for coating the existing linings in furnaces and other combustion-chambers and for all surfaces exposed to high temperatures, the action of molten metals, acid, or other corrosive gases. This composition can be applied with a trowel like plaster, made into a stiff plastic and rammed to form, pressed to shape, or mixed sufficiently plastic to be poured to form like concrete or gypsum products.

The process consists in treating carbid of silicon, (carborundum powders) with a caustic alkali solution (preferably sodium hydroxid in water) using twelve to fifteen pounds of the carbid of silicon in each gallon of the soda lye, placing same in a container of sufficient capacity and let stand until the hydrogen formed by the action of the soda lye or other caustic solution upon the free silicon in the carbid of silicon is exhausted. The rapid generation of the hydrogen will cause the composition to foam and it will require three gallon container capacity for each gallon of plastic being made. When the hydrogen is exhausted the foam like composition can be stirred down to the plastic form and brought to the desired consistency either by the addition of water to thin it or by the addition of more carbid of silicon if a thick and stiff plastic is wanted. When packed in sealed containers the composition will remain plastic or it may be used immediately upon being prepared.

Having described this process, what I claim as my invention and discovery and wish to secure by Letters Patent is—

A process for making a refractory plastic consisting in treating silicon carbid containing free silicon with a caustic alkali solution to generate hydrogen, and after the evolution of hydrogen has ceased, stirring the mass down to original volume.

EDWARD R. STOWELL.

Witnesses:
FRANK ARMSTRONG,
AUBREY L. STOWELL.